United States Patent Office.

W. P. Dugdale,
Shaft Coupling.
No. 96,406.  Patented Nov. 2, 1869.
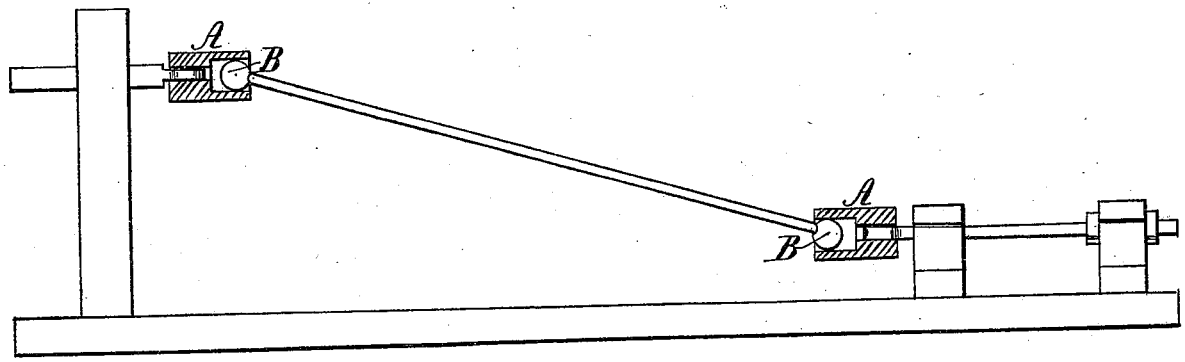
Witnesses
Hinchman
Jno. A. N. Brooks
Inventor
W. P. Dugdale
per Munn & Co.

WILFRED P. DUGDALE, OF GOSHEN, INDIANA.

Letters Patent No. 96,406, dated November 2, 1869; antedated October 30, 1869.

---

IMPROVED SHAFT-COUPLING.

---

The Schedule referred to in these Letters Patent and making part of the same.

---

*To all whom it may concern:*

Be it known that I, WILFRED P. DUGDALE, of Goshen, in the county of Elkhart, and State of Indiana, have invented a new and improved Universal Shaft-Coupling; and I do hereby declare that the following is a full, clear, and exact description thereof, which will enable others skilled in the art to make and use the same, reference being had to the accompanying drawing, forming part of this specification.

This invention relates to improvements in shaft-couplings, such as are used for coupling-shafts when required to run out of a right line; and has for its object to provide a coupling of simple and cheap construction, which may be readily connected or disconnected, and having no projecting parts, such as screw-bolts, liable to catch into the clothing of attendants, and gather straws, &c., and is designed, more especially, to be used with threshing-machines, but applicable to other uses.

The drawing represents sections of shafting, coupled together according to my improvement, the coupling-blocks being shown in section.

I take blocks of metal, A, preferably of cylindrical form, and make rectangular mortises in each end of greater breadth in one direction than the other, the planes of the greatest breadth of each mortise being at right angles to each other; and, on the ends of the shafts to be coupled together, I make flat circular enlargements, B, to fit the said mortises, inserting them therein, as represented in the drawings, and so arranging them that they are not permitted to have end-play or movement sufficient to become disconnected.

It will be readily seen, that this arrangement permits the required continuous relative change of the sections of shafts, when placed in other than right lines; also, that there are no projecting bolts or nuts, nor is there any delay caused in connecting or disconnecting the sections; also, that the construction is less expensive than any other.

These couplings answer for shafts placed in a right line equally as well as others.

Having thus described my invention,

What I claim as new, and desire to secure by Letters Patent, is—

The universal coupling-joints, consisting of the blocks A, mortised or recessed as described, and the enlarged ends B, of the shafts, fitted thereto, all substantially as specified.

WILFRED P. DUGDALE.

Witnesses:
HENRY DICK,
ELIAS GORTNER.